United States Patent
Tabata et al.

(10) Patent No.: US 11,692,894 B2
(45) Date of Patent: Jul. 4, 2023

(54) OIL PRESSURE ESTIMATION DEVICE AND STORAGE MEDIUM

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 17/370,014

(22) Filed: Jul. 8, 2021

(65) Prior Publication Data

US 2022/0099515 A1    Mar. 31, 2022

(30) Foreign Application Priority Data

Sep. 29, 2020 (JP) .................. 2020-163040

(51) Int. Cl.
| | |
|---|---|
| G01L 13/00 | (2006.01) |
| G06N 20/00 | (2019.01) |
| G07C 5/08 | (2006.01) |
| F16H 61/14 | (2006.01) |
| F16H 61/00 | (2006.01) |

(52) U.S. Cl.
CPC ............ G01L 13/00 (2013.01); F16H 61/143 (2013.01); G06N 20/00 (2019.01); G07C 5/08 (2013.01); *F16H 2061/0087* (2013.01); *F16H 2061/0096* (2013.01)

(58) Field of Classification Search
CPC ......... G01L 13/00; G07C 5/08; F16H 61/143; F16H 2061/0087; F16H 2061/0096
See application file for complete search history.

(56) References Cited

U.S. PATENT DOCUMENTS

| | | | | |
|---|---|---|---|---|
| 5,609,551 A | * | 3/1997 | Sakai .................... | F16H 61/143 477/171 |
| 5,947,865 A | * | 9/1999 | Watanabe ............. | F16H 61/143 477/169 |
| 7,509,203 B2 | * | 3/2009 | Imamura ............... | F16H 61/143 475/43 |
| 11,466,772 B2 | * | 10/2022 | Nakasone ........... | F16H 57/0436 |

FOREIGN PATENT DOCUMENTS

| | | |
|---|---|---|
| JP | 2010-156359 A | 7/2010 |
| JP | 2012-177434 A | 9/2012 |

* cited by examiner

*Primary Examiner* — Huan Le
(74) *Attorney, Agent, or Firm* — Oliff PLC (57) ABSTRACT

An oil pressure estimation device for calculating an estimated differential pressure that is an estimated value of a differential pressure between two oil chambers generated in a torque converter including the two oil chambers and a lockup clutch includes a storage device and an execution device. The storage device stores mapping data defining a mapping, the mapping outputting as an output variable an estimated differential pressure variable indicating the estimated differential pressure, in response to input of an input variable, and the mapping having been trained by machine learning. The mapping includes an instruction differential pressure variable indicating the instruction differential pressure as one of a plurality of the input variables. The execution device executes an acquisition process of acquiring a value of the input variable and a calculation process of inputting the value of the input variable into the mapping to calculate a value of the output variable.

8 Claims, 3 Drawing Sheets

OIL PRESSURE ESTIMATION DEVICE AND STORAGE MEDIUM

CROSS-REFERENCE TO RELATED APPLICATION

This application claims priority to Japanese Patent Application No. 2020-163040 filed on Sep. 29, 2020, incorporated herein by reference in its entirety.

BACKGROUND

1. Technical Field

The present disclosure relates to an oil pressure estimation device and a storage medium.

2. Description of Related Art

A vehicle disclosed in Japanese Unexamined Patent Application Publication No. 2010-156359 (JP 2010-156359 A) includes an internal combustion engine, a torque converter, and an automatic transmission. An output shaft of the internal combustion engine is connected to an input shaft of the torque converter. The torque converter transmits torque between the input shaft and the output shaft via a fluid. The output shaft of the torque converter is connected to the input shaft of the automatic transmission.

The torque converter includes a lockup clutch. The lockup clutch is switched between in an engaged state in which the input shaft and the output shaft of the torque converter are mechanically directly connected and in a released state in which the connection is released. The lockup clutch operates in accordance with oil pressure.

The vehicle includes a control device. The control device switches the state of the lockup clutch by controlling the oil pressure.

SUMMARY

In a technique as in JP 2010-156359 A that controls the oil pressure related to the lockup clutch, a deviation may occur between an instruction value of the oil pressure and the actual oil pressure. Therefore, in order to control the oil pressure with high accuracy, it is necessary to estimate the actual oil pressure with high accuracy and control the oil pressure in consideration of the deviation between the estimated value of the oil pressure and the instruction value of the oil pressure. In order to accurately estimate the actual oil pressure, it is necessary to grasp the relationship between the instruction value of the oil pressure and the actual oil pressure and incorporate the relationship in the estimation of the oil pressure. For that purpose, it is necessary to derive relational expressions and the like expressing the relationship between the instruction value of the oil pressure and the actual oil pressure. However, such relational expressions are very complicated and requires time and effort to derive.

A first aspect of the present disclosure relates to an oil pressure estimation device. The oil pressure estimation device sets, as a simulation target, a torque converter including two oil chambers and a lockup clutch, the lockup clutch being switched between in an engaged state and in a released state in accordance with a differential pressure between the two oil chambers, and calculates, based on an instruction differential pressure that is an instruction value of the differential pressure for the torque converter, an estimated differential pressure that is an estimated value of the differential pressure generated in the torque converter. The oil pressure estimation device includes a storage device and an execution device. The storage device is configured to store mapping data defining a mapping, the mapping outputting as an output variable an estimated differential pressure variable that is a variable indicating the estimated differential pressure, in response to input of an input variable, and the mapping having been trained by machine learning. Here, the mapping includes an instruction differential pressure variable that is a variable indicating the instruction differential pressure as one of a plurality of the input variables. The execution device is configured to execute an acquisition process of acquiring a value of the input variable and a calculation process of inputting the value of the input variable acquired through the acquisition process into the mapping to calculate a value of the output variable.

In the oil pressure estimation device of the first aspect, when the mapping is used for calculating the estimated differential pressure, it is only necessary to train the mapping using appropriate data in order to appropriately calculate the estimated differential pressure. Therefore, incorporating the relationship between the instruction differential pressure and the actual differential pressure into the calculation of the estimated differential pressure does not require time and effort as those in the case of deriving a complicated relational expression.

In the oil pressure estimation device of the first aspect, the storage device and the execution device may be provided in a vehicle equipped with the torque converter. The storage device may be configured to store a plurality of mappings for respective phases obtained by dividing a period from a start of switching of the lockup clutch to the engaged state to a start of switching of the lockup clutch to the released state into a plurality of phases. The execution device may be configured to execute the acquisition process, a selection process, and the calculation process. The acquisition process may include acquiring the value of the input variable when the instruction differential pressure is output to the torque converter. The selection process may include selecting, from the mappings for the respective phases, the mapping corresponding to a phase in which the instruction differential pressure is output. The calculation process may include calculating the value of the output variable by inputting the value of the input variable acquired through the acquisition process into the mapping selected through the selection process.

In the oil pressure estimation device having the above configuration, a dedicated mapping is used for each phase. Therefore, even when the relationship between the instruction differential pressure and the estimated differential pressure is different depending on the phase, the difference can be incorporated into the output variable.

In the oil pressure estimation device having the above configuration, as one of the input variables, an acceleration variable that is a variable indicating an acceleration of the vehicle may be included. In the oil pressure estimation device having the above configuration, even when the relationship between the instruction differential pressure and the estimated differential pressure during acceleration of the vehicle differs from that during deceleration of the vehicle, it is possible to obtain an accurate output variable corresponding to the difference.

In the oil pressure estimation device having the above configuration, as one of the input variables, an accelerator variable that is a variable indicating an operation amount of an accelerator of the vehicle may be included. In the oil pressure estimation device having the above configuration, since the accelerator variable is included as one of the input variables, an output variable corresponding to the torque applied to the torque converter can be obtained.

In the oil pressure estimation device having the above configuration, as one of the input variables, a vehicle speed variable that is a variable indicating a traveling speed of the vehicle may be included. In the oil pressure estimation device having the above configuration, even when the relationship between the instruction differential pressure and the estimated differential pressure differs depending on the traveling speed of the vehicle, an accurate output variable can be obtained.

In the oil pressure estimation device having the above configuration, as one of the input variables, a shift variable that is a variable indicating a gear ratio of a transmission of the vehicle may be included. In the oil pressure estimation device having the above configuration, even when the relationship between the instruction differential pressure and the estimated differential pressure differs depending on the gear ratio of the transmission, an accurate output variable can be obtained.

In the oil pressure estimation device having the above configuration, as one of the input variables, an oil temperature variable that is a variable indicating a temperature of hydraulic oil supplied to the torque converter may be included. In the oil pressure estimation device having the above configuration, it is possible to obtain an output variable corresponding to the temperature of the hydraulic oil that can affect the estimated differential pressure.

A second aspect of the present disclosure is a non-transitory storage medium storing instructions that are executable by one or more processors included in a execution device of an oil pressure estimation device and that cause the one or more processors to perform the following functions. The functions included an acquisition process of acquiring a value of an input variable and a calculation process of inputting the value of the input variable acquired through the acquisition process into a mapping to calculate a value of an output variable. The oil pressure estimation device sets, as a simulation target, a torque converter including two oil chambers and a lockup clutch, the lockup clutch being switched between in an engaged state and in a released state in accordance with a differential pressure between the two oil chambers. The oil pressure estimation device includes a storage device and the execution device. The storage device stores mapping data defining a mapping, the mapping outputting as the output variable an estimated differential pressure variable that is a variable indicating an estimated differential pressure that is an estimated value of the differential pressure generated in the torque converter, in response to input of the input variable, and the mapping having been trained by machine learning. Here, the mapping includes an instruction differential pressure variable that is a variable indicating an instruction differential pressure that is an instruction value of the differential pressure for the torque converter as one of a plurality of the input variables.

In the storage medium of the second aspect, when the mapping is used for calculating the estimated differential pressure, it is only necessary to train the mapping using appropriate data in order to appropriately calculate the estimated differential pressure. Therefore, incorporating the relationship between the instruction differential pressure and the actual differential pressure into the calculation of the estimated differential pressure does not require time and effort as those in the case of deriving a complicated relational expression.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
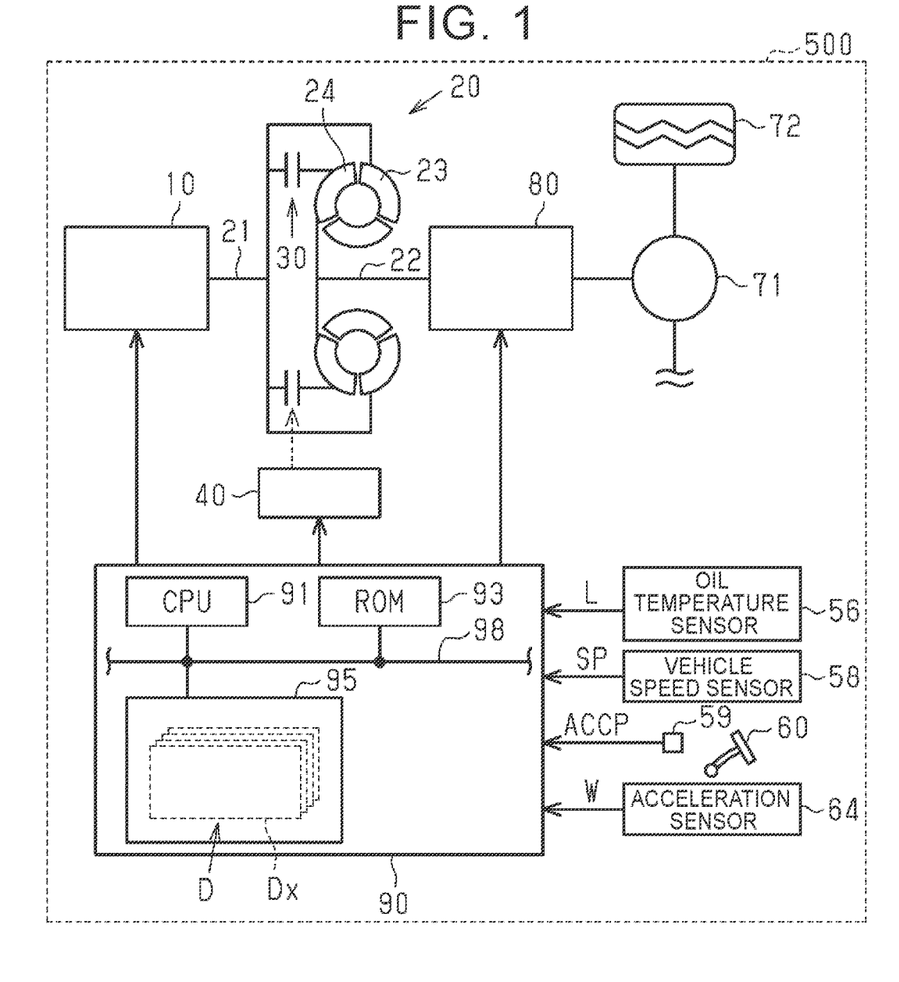
FIG. 1 is a schematic configuration diagram of a vehicle according to an embodiment of the present disclosure.

Hereinafter, an embodiment of an oil pressure estimation device applied to a vehicle will be described with reference to the drawings. First, the schematic configuration of the vehicle will be described. As shown in FIG. 1, a vehicle 500 includes an internal combustion engine 10, a torque converter 20, an automatic transmission 80, a differential 71, and drive wheels 72. The internal combustion engine 10 is a drive source for the vehicle 500. A crankshaft that is an output shaft of the internal combustion engine 10 is connected to an input shaft 21 of the torque converter 20. The torque converter 20 is a fluid coupling having a torque amplification function. An output shaft 22 of the torque converter 20 is connected to an input shaft of the automatic transmission 80. The automatic transmission 80 is a multi-stage transmission. An output shaft of the automatic transmission 80 is connected to the drive wheels 72 via the differential 71. The differential 71 allows occurrence of a difference in rotation speed between the right and left drive wheels 72.

The torque converter 20 includes a pump impeller 23 and a turbine runner 24. Specifically, the pump impeller 23 is connected to the input shaft 21 of the torque converter 20. The pump impeller 23 rotates integrally with the input shaft 21. The turbine runner 24 is located at a position facing the pump impeller 23. The turbine runner 24 is connected to the output shaft 22 of the torque converter 20. The turbine runner 24 rotates integrally with the output shaft 22. In the torque converter 20, torque is transmitted between the pump impeller 23 and the turbine runner 24 via a fluid.

Figure 2:
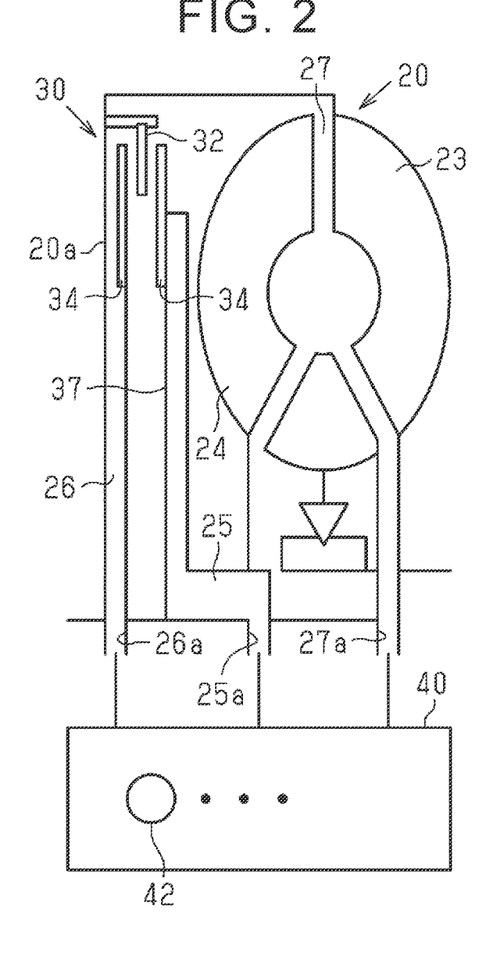
FIG. 2 is a schematic configuration diagram of a torque converter shown in FIG. 1.

The torque converter 20 includes a lockup clutch 30, as shown in FIG. 2. The lockup clutch 30 is a multi-plate clutch. That is, the lockup clutch 30 includes a plurality of first friction plates 32 and a plurality of second friction plates 34. In the present embodiment, two first friction plates 32 and two second friction plates 34 are provided. Note that FIG. 2 shows only one first friction plate 32. The first friction plates 32 and the second friction plates 34 are arranged alternately. The adjacent first and second friction plates 32, 34 face each other. The first friction plates 32 and the second friction plates 34 are movable in an arrangement direction thereof. The first friction plates 32 rotate integrally with the pump impeller 23. The second friction plates 34 rotate integrally with the turbine runner 24. A group of friction plates composed of the first friction plates 32 and the second friction plates 34 is referred to as a friction plate group.

The torque converter 20 includes a front cover 20a and a piston 37. The front cover 20a is located on one side of the friction plate group in the arrangement direction of the first friction plates 32 and the second friction plates 34. The front cover 20a constitutes a part of the housing of the torque converter 20. The piston 37 is located on the other side of the friction plate group in the arrangement direction of the first friction plates 32 and the second friction plates 34. The piston 37 is movable in the arrangement direction of the first friction plates 32 and the second friction plates 34. When the piston 37 approaches the front cover 20a, the friction plate group is sandwiched between the piston 37 and the front cover 20a. In this case, the adjacent first and second friction plates 32, 34 come into contact with each other. When the piston 37 moves away from the front cover 20a, the state in which the friction plate group is sandwiched between the piston 37 and the front cover 20a is eliminated. In this case, the adjacent first and second friction plates 32, 34 are arranged at positions separated from each other.

The torque converter 20 includes a control oil chamber 25, a front side oil chamber 26, and a rear side oil chamber 27. Specifically, in the torque converter 20, the control oil chamber 25 is defined in the vicinity of the friction plate group. The control oil chamber 25 is connected to a control port 25a. The control oil chamber 25 receives supply of hydraulic oil via the control port 25a. The hydraulic oil in the control oil chamber 25 is discharged to the outside via the control port 25a.

The front side oil chamber 26 is defined in the vicinity of the control oil chamber 25. The front side oil chamber 26 is connected to a supply port 26a. The front side oil chamber 26 receives supply of the hydraulic oil via the supply port 26a. The rear side oil chamber 27 is defined in the torque converter 20. The rear side oil chamber 27 communicates with the front side oil chamber 26. The rear side oil chamber 27 is connected to a discharge port 27a. The hydraulic oil in the rear side oil chamber 27 is discharged to the outside via the discharge port 27a.

The front side oil chamber 26 is adjacent to the control oil chamber 25 in the arrangement direction of the first friction plates 32 and the second friction plates 34. A part of the piston 37 extends at a position between the front side oil chamber 26 and the control oil chamber 25. The front side oil chamber 26 is located more toward the front cover 20a than the piston 37 in the arrangement direction of the first friction plates 32 and the second friction plates 34. Although detailed illustration is omitted, the piston 37 separates the front side oil chamber 26 and the control oil chamber 25. Thus, the piston 37 operates in the arrangement direction of the first friction plates 32 and the second friction plates 34 in accordance with the differential pressure between the front side oil chamber 26 and the control oil chamber 25.

The operating state of the lockup clutch 30 is switched by the operation of the piston 37 in accordance with the differential pressure between the front side oil chamber 26 and the control oil chamber 25. In the following, a value obtained by subtracting a pressure of the hydraulic oil (hereinafter referred to as oil pressure) PF of the front side oil chamber 26 from an oil pressure PC in the control oil chamber 25 is referred to as a lockup differential pressure $\Delta P$. In the present embodiment, when the lockup differential pressure $\Delta P$ is negative, that is, when the oil pressure PC of the control oil chamber 25 is lower than the oil pressure PF of the front side oil chamber 26, the piston 37 moves away from the front cover 20a. In this case, the adjacent first and second friction plates 32, 34 are arranged at positions separated from each other. That is, the operating state of the lockup clutch 30 is a released state. Since the adjacent first and second friction plates 32, 34 are separated from each other, the pump impeller 23 and the turbine runner 24 are not directly connected.

On the other hand, when the lockup differential pressure $\Delta P$ is zero or more, that is, when the oil pressure PC of the control oil chamber 25 is equal to or higher than the oil pressure PF of the front side oil chamber 26, the piston 37 approaches the front cover 20a. Then, the adjacent first and second friction plates 32, 34 come into contact with each other. That is, the operating state of the lockup clutch 30 becomes an engaged state. Since the adjacent first and second friction plates 32, 34 come into contact with each other, the pump impeller 23 and the turbine runner 24 are mechanically directly connected.

The modes in which the operating state of the lockup clutch 30 is the engaged state include a semi-engaged state and a fully-engaged state. When the lockup differential pressure $\Delta P$ is correspondingly small, the operating state of the lockup clutch 30 is the semi-engaged state. In this case, the adjacent first and second friction plates 32, 34 are in a slip state in which slippage occurs therebetween. Further, when the lockup differential pressure $\Delta P$ becomes considerably large, that is, the maximum allowable value and the like, the operating state of the lockup clutch 30 becomes a fully-engaged state. In this case, slippage does not occur between the adjacent first and second friction plates 32, 34.

The mode of torque transmission by the torque converter 20 is switched in accordance with the operating state of the lockup clutch 30 described above. When the lockup clutch 30 is in the released state, the torque transmission amount via the lockup clutch 30 becomes zero. Then, the torque converter 20 transmits torque from the input shaft 21 to the output shaft 22 by torque transmission between the pump impeller 23 and the turbine runner 24 via a fluid. When the lockup clutch 30 is in the semi-engaged state, the efficiency of torque transmission varies depending on the degree of slippage of the first friction plates 32 and the second friction plates 34. The smaller the amount of slippage, the smaller the difference between the rotation speed of the pump impeller 23 and the rotation speed of the turbine runner 24, and the efficiency of torque transmission from the input shaft 21 to the output shaft 22 increases. When the lockup clutch 30 is in the fully-engaged state, the pump impeller 23 and the turbine runner 24 rotate integrally. As a result, torque is transmitted from the input shaft 21 to the output shaft 22 with almost no loss.

The vehicle 500 includes a hydraulic circuit 40. The hydraulic circuit 40 is a flow path through which hydraulic oil flows. The hydraulic circuit 40 is connected to the control port 25a, the supply port 26a, and the discharge port 27a. A plurality of solenoid valves 42 is provided halfway through the hydraulic circuit 40. With turning on and off of the solenoid valves 42, hydraulic oil is supplied and discharged to and from the control oil chamber 25, the front side oil chamber 26, and the rear side oil chamber 27.

As shown in FIG. 1, the vehicle 500 is equipped with a vehicle speed sensor 58, an accelerator sensor 59, an acceleration sensor 64, and an oil temperature sensor 56. The vehicle 500 is also equipped with an accelerator pedal 60. The vehicle speed sensor 58 detects a vehicle speed SP that is the traveling speed of the vehicle 500. The accelerator sensor 59 detects an accelerator operation amount ACCP that is an operation amount of the accelerator pedal 60 operated by a driver. The acceleration sensor 64 detects a front-rear acceleration W that is an acceleration in the front-rear direction of the vehicle 500. The oil temperature sensor 56 detects an oil temperature L that is the temperature of the hydraulic oil flowing through the hydraulic circuit 40.

Next, an outline of the vehicle control configuration will be described. The vehicle 500 includes a control device 90. The control device 90 can be configured as one or more processors that execute various processes according to a computer program (software). The control device 90 may be configured as one or more dedicated hardware circuits such as application specific integrated circuits (ASICs) that execute at least a part of the various processes, or circuitry including a combination of the hardware circuits. The processor includes a central processing unit (CPU) 91 and a memory such as a random access memory (RAM) and a read only memory (ROM) 93. The memory stores program codes or commands configured to cause the CPU 91 to execute processes. The memory, namely, a computer-readable medium, includes any available medium accessible to a general-purpose or dedicated computer. Further, the control device 90 includes a storage device 95 that is an electrically rewritable non-volatile memory. The CPU 91, the ROM 93, and the storage device 95 can communicate with each other via an internal bus 98.

Detection signals from various sensors attached to the vehicle 500 are input to the control device 90. Specifically, detection signals for the following parameters are input to the control device 90.
Vehicle speed SP detected by the vehicle speed sensor 58
Accelerator operation amount ACCP detected by the accelerator sensor 59
Front-rear acceleration W detected by the acceleration sensor 64
Oil temperature L detected by the oil temperature sensor 56

The CPU 91 controls the internal combustion engine 10, the automatic transmission 80, and the like by executing various programs stored in the ROM 93. Specifically, the CPU 91 calculates a target torque of the internal combustion engine 10 based on the accelerator operation amount ACCP and the vehicle speed SP. Then, the CPU 91 controls the internal combustion engine 10 so that the output torque of the internal combustion engine 10 becomes the target torque. Further, the CPU 91 calculates a target shift stage SFT of the automatic transmission 80 based on the accelerator operation amount ACCP and the vehicle speed SP. Then, the CPU 91 controls the automatic transmission 80 so that the shift stage of the automatic transmission 80 becomes the target shift stage SFT.

The CPU 91 controls the lockup clutch 30 by executing the program stored in the ROM 93. The CPU 91 executes a target determination process, an engagement process, and a phase specification process in controlling the lockup clutch 30. Hereinafter, these processes will be described in order.

First, the target determination process will be described. The CPU 91 repeatedly executes the target determination process while the vehicle 500 is traveling. The target determination process is a process of determining a target operating state of the lockup clutch 30. In the target determination process, the CPU 91 determines the target operating state of the lockup clutch based on the accelerator operation amount ACCP, the vehicle speed SP, the target shift stage SFT, and the acceleration state of the vehicle 500. In the determination, the CPU 91 refers to a lockup map stored in the ROM 93.

Figure 3:
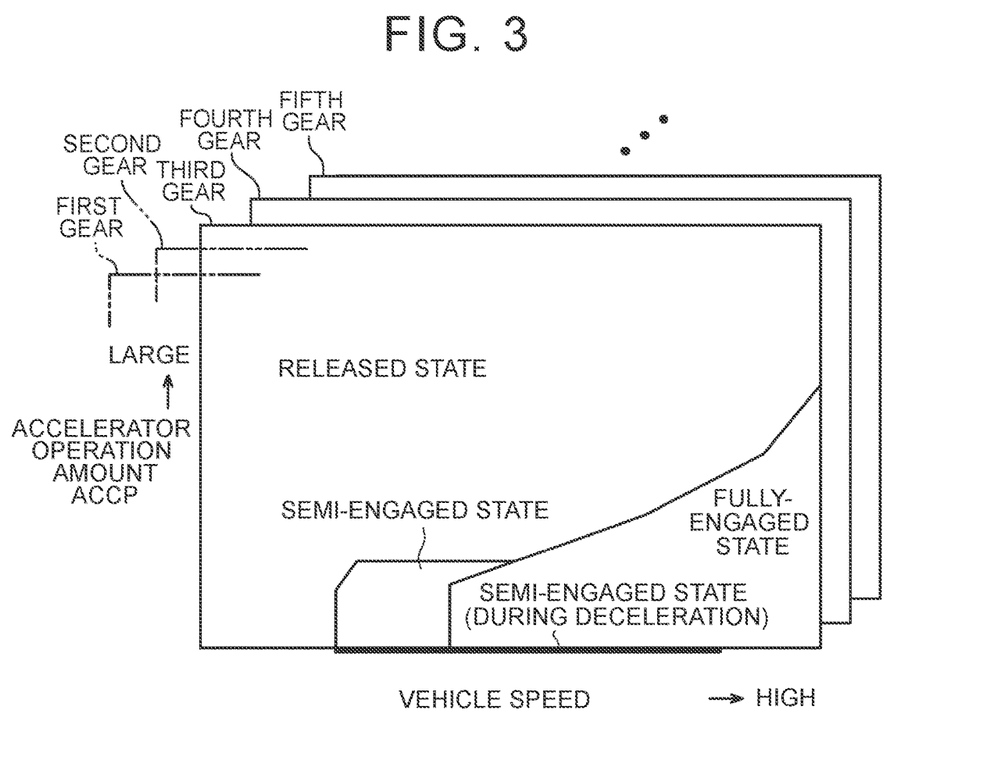
FIG. 3 is a diagram showing an example of a lockup map shown in FIG. 1.

As shown in FIG. 3, the lockup map defines the target operating state for each driving range of the vehicle 500 defined by the vehicle speed SP and the accelerator operation amount ACCP. The lockup map is prepared for each target shift stage SFT. As an outline, in each lockup map, the released state is set in the driving range where the accelerator operation amount ACCP is large. In the driving range where the accelerator operation amount ACCP is small, the released state is set on the low vehicle speed side, and the fully-engaged state is set on the high vehicle speed side. Then, the semi-engaged state is set between in the released state and in the fully-engaged state in the driving range where the accelerator operation amount ACCP is larger than zero. Further, as shown by the thick solid line in FIG. 3, the semi-engaged state is also set in the driving range where the accelerator operation amount ACCP is zero. That is, the driving range is set in which the operating state of the lockup clutch becomes the semi-engaged state during deceleration of the vehicle 500.

When determining the target operating state of the lockup clutch 30, the CPU 91 selects a lockup map corresponding to the latest target shift stage SFT. Then, the CPU 91 determines the target operating state corresponding to the latest accelerator operation amount ACCP and the latest vehicle speed SP in the selected lockup map.

Next, the engagement process will be described. When the target operating state of the lockup clutch 30 is switched from the released state to the engaged state in the target determination process, the CPU 91 executes the engagement process. The engagement process is a process for switching the operating state of the lockup clutch 30 to the engaged state and maintaining the operating state of the lockup clutch 30 in the engaged state. In the engagement process, the CPU 91 repeatedly calculates an instruction differential pressure ΔPG that is an instruction value of the lockup differential pressure ΔP to the torque converter 20. When the CPU 91 calculates the instruction differential pressure ΔPG, the CPU 91 outputs a control signal based on the instruction differential pressure ΔPG to the hydraulic circuit 40. Each solenoid valve 42 of the hydraulic circuit 40 operates in response to this control signal to supply and discharge hydraulic oil to and from the control oil chamber 25, the front side oil chamber 26, and the rear side oil chamber 27. That is, the CPU 91 outputs the instruction differential pressure ΔPG to the torque converter 20 through the control signal, so that hydraulic oil is supplied and discharged to and from each oil chamber of the torque converter 20.

In the engagement process, the CPU 91 changes the instruction differential pressure ΔPG as follows. Hereinafter, the operation of the lockup clutch 30 accompanying the engagement process will be described together with a way of changing the instruction differential pressure ΔPG.

Figure 4:
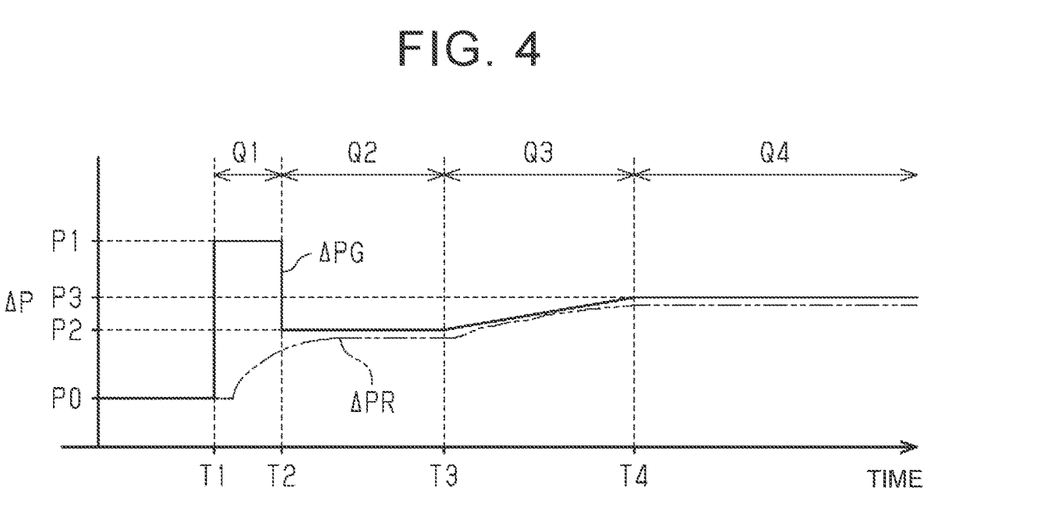
FIG. 4 is a diagram showing an example of a time-series change in an instruction differential pressure in an engagement process executed by a control device shown in FIG. 1.

As shown in FIG. 4, when the engagement process is started at a time T1, the CPU 91 rapidly increases the instruction differential pressure ΔPG for the torque converter 20 from a value P0 set in the released state to an application differential pressure P1. Then, the CPU 91 maintains the instruction differential pressure ΔPG at the application differential pressure P1 until a predetermined first period has elapsed from the start of the engagement process. During this time, packing of the lockup clutch 30 starts. That is, the distance between the adjacent first and second friction plates 32, 34 starts to narrow. The application differential pressure P1 is determined in advance as the lockup differential pressure ΔP required to start the packing. The timing at which the CPU 91 starts the engagement process is a timing at which the lockup clutch 30 starts switching from the released state to the engaged state.

The CPU 91 reduces the instruction differential pressure $\Delta PG$ to a standby differential pressure P2 at a time T2 after the first period has elapsed from the time T1. Then, the CPU 91 maintains the instruction differential pressure $\Delta PG$ at the standby differential pressure P2 until a predetermined second period elapses after the instruction differential pressure $\Delta PG$ is reduced to the standby differential pressure P2. During this time, the packing of the lockup clutch 30 is completed. The standby differential pressure P2 is determined in advance as the lockup differential pressure $\Delta P$ just before the adjacent first and second friction plates 32, 34 come into contact with each other.

At a time T3 after the second period has elapsed from the time T2, the CPU 91 ends maintaining the instruction differential pressure $\Delta PG$ at the standby differential pressure P2. The CPU 91 increases the instruction differential pressure $\Delta PG$ at a differential pressure change rate $\alpha$ from the time T3 until a predetermined third period has elapsed. During this time, the slip amount of the lockup clutch 30 gradually decreases. When the second period has elapsed, the CPU 91 calculates a final target differential pressure P3 based on the accelerator operation amount ACCP, the vehicle speed SP, the target shift stage SFT, the oil temperature L, and the front-rear acceleration W of the vehicle 500. The final target differential pressure P3 is the lockup differential pressure $\Delta P$ required to realize the engaged state defined as the target operating state, namely, the fully-engaged state, or the semi-engaged state with a certain slip amount. When the CPU 91 calculates the final target differential pressure P3, the CPU 91 divides the value obtained by subtracting the standby differential pressure P2 from the final target differential pressure P3 by the third period, and determines that value as the differential pressure change rate $\alpha$. That is, the differential pressure change rate $\alpha$ is the rate of change of the instruction differential pressure $\Delta PG$ per unit time for bringing the instruction differential pressure $\Delta PG$ to the final target differential pressure P3 during the third period. The CPU 91 increases the instruction differential pressure $\Delta PG$ based on the differential pressure change rate $\alpha$.

At a time T4 after the third period has elapsed from the time T3, the CPU 91 ends increasing the instruction differential pressure $\Delta PG$. Then, the CPU 91 maintains the instruction differential pressure $\Delta PG$ at the final target differential pressure P3 from the time T4 until the target operating state of the lockup clutch 30 is switched from the engaged state to the released state. Along with this, the lockup clutch 30 is maintained in the fully-engaged state or the semi-engaged state with a certain slip amount.

When the target operating state of the lockup clutch 30 is switched from the engaged state to the released state, the CPU 91 ends the engagement process. After that, the CPU 91 starts a process of reducing the instruction differential pressure $\Delta PG$ as a process for switching the operating state of the lockup clutch 30 to the released state. That is, the timing at which the CPU 91 ends the engagement process is a timing at which the lockup clutch 30 starts switching from the engaged state to the released state.

Next, the phase specification process will be described. The CPU 91 repeatedly executes the phase specification process during the execution of the engagement process. The phase specification process is a process of specifying a plurality of phases obtained by dividing the execution process of the engagement process and calculating phase variables PHS corresponding to the specified phases. The phase variables PHS are variables for specifying the phases of the engagement process.

In the present embodiment, the CPU 91 specifies four phases. As shown in FIG. 4, a first phase Q1 represents a stage from the time T1 to the time T2 in which the instruction differential pressure $\Delta PG$ is maintained at the application differential pressure P1 in the series of processes of the engagement process. A second phase Q2 represents a stage from the time T2 to the time T3 in which the instruction differential pressure $\Delta PG$ is maintained at the standby differential pressure P2. A third phase Q3 represents a stage from the time T3 to the time T4 in which the instruction differential pressure $\Delta PG$ is increased at the differential pressure change rate $\alpha$. A fourth phase Q4 represents a stage from the time T4 in which the instruction differential pressure $\Delta PG$ is maintained at the final target differential pressure P3. The CPU 91 refers to content of the processes executed in the engagement process and specifies the phase in the engagement process.

When the CPU 91 specifies the phase, the CPU 91 calculates the phase variable PHS. In the present embodiment, the phase variable PHS is defined as a positive integer that identifies each phase, that is, for example, "1" for the first phase Q1 and "2" for the second phase Q2. The CPU 91 calculates a value corresponding to the specified phase as the phase variable PHS.

Next, the control configuration related to the calculation of the estimated differential pressure will be described. The control device 90 functions as the oil pressure estimation device that calculates an estimated differential pressure $\Delta PS$ that is an estimated value of the lockup differential pressure $\Delta P$ that actually occurs in the torque converter 20. That is, the control device 90 sets the torque converter 20 as a simulation target, and simulates the actual lockup differential pressure $\Delta P$ of the torque converter 20.

As shown in FIG. 1, the storage device 95 stores mapping data D. The mapping data D is data that defines a mapping Dx that outputs an output variable when input variables are input. In the present embodiment, the input variables include an instruction differential pressure variable that is a variable indicating the instruction differential pressure $\Delta PG$, an acceleration variable that is a variable indicating the front-rear acceleration W, an accelerator variable that is a variable indicating the accelerator operation amount ACCP, a vehicle speed variable that is a variable indicating the vehicle speed SP, a shift variable that is a variable indicating the gear ratio of the automatic transmission 80, and an oil temperature variable that is a variable indicating the oil temperature L. The output variable is an estimated differential pressure variable that is a variable indicating the estimated differential pressure $\Delta PS$.

The mapping data D stored in the storage device 95 includes the mapping Dx for each phase of the engagement process. That is, the storage device 95 stores four mappings Dx corresponding to the first phase Q1 to the fourth phase Q4 that are obtained by dividing the execution process of the engagement process into four.

The CPU 91 can execute the differential pressure estimation process that is a process of calculating the estimated differential pressure $\Delta PS$ during the execution of the engagement process. The CPU 91 realizes each process of the differential pressure estimation process by executing the program stored in the ROM 93. In the present embodiment, the CPU 91 and the ROM 93 constitute an execution device.

The CPU 91 executes an acquisition process, a selection process, and a calculation process in the differential pressure estimation process. In the acquisition process, the CPU 91 acquires various input variables required for calculating the estimated differential pressure ΔPS, such as the instruction differential pressure ΔPG. The CPU 91 acquires the various input variables when the instruction differential pressure ΔPG for the torque converter 20 is output, that is, when the control signal for the hydraulic circuit 40 is output, in the engagement process executed in the background. In the selection process, the CPU 91 selects, from the mappings Dx for the phases stored in the storage device 95, the mapping Dx corresponding to the phase when the instruction differential pressure ΔPG is output. In the calculation process, the CPU 91 calculates the value of the output variable by inputting the values of the input variables acquired through the acquisition process into the mapping Dx selected in the selection process.

Figure 5:
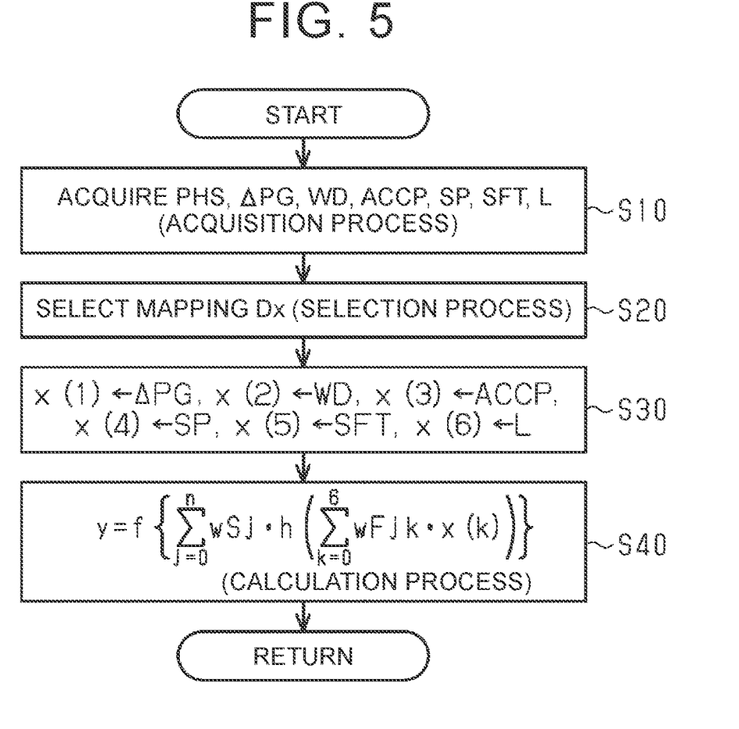
FIG. 5 is a flowchart showing a process procedure of a differential pressure estimation process executed by the control device.

Next, the differential pressure estimation process will be described. The CPU 91 repeatedly executes the differential pressure estimation process during the execution of the engagement process. As shown in FIG. 5, when the CPU 91 starts the differential pressure estimation process, the CPU 91 executes the process of step S10. In step S10, the CPU 91 acquires various variables required for the processes from step S20. Specifically, the CPU 91 acquires the phase variable PHS, the instruction differential pressure ΔPG, an acceleration identification value WD, the accelerator operation amount ACCP, the vehicle speed SP, the target shift stage SFT, and the oil temperature L.

For the phase variable PHS, the CPU 91 acquires the latest value calculated in the phase specification process. For the instruction differential pressure ΔPG, the CPU 91 acquires the latest value calculated in the engagement process. The instruction differential pressure ΔPG is the instruction differential pressure variable. For the accelerator operation amount ACCP, the CPU 91 acquires the latest value input to the control device 90 from the accelerator sensor 59. The accelerator operation amount ACCP is the accelerator operation amount variable. For the vehicle speed SP, the CPU 91 acquires the latest value input to the control device 90 from the vehicle speed sensor 58. For the target shift stage SFT, the CPU 91 acquires the latest value calculated for controlling the automatic transmission 80. The target shift stage SFT is the shift variable. For the oil temperature L, the CPU 91 acquires the latest value input to the control device 90 from the oil temperature sensor 56. The oil temperature L is the oil temperature variable.

The acceleration identification value WD is an identification value for identifying whether the vehicle 500 is accelerating or decelerating. In the present embodiment, the acceleration identification value WD is "1" when the vehicle 500 is accelerating, "2" when the vehicle 500 is decelerating, and "3" when the vehicle 500 is traveling at a constant speed. In step S10, the CPU 91 acquires the latest value input to the control device 90 from the acceleration sensor 64. The CPU 91 calculates the acceleration identification value WD as "1" when the front-rear acceleration W is a positive value, that is, when the vehicle 500 is accelerating. The CPU 91 calculates the acceleration identification value WD as "2" when the front-rear acceleration W is a negative value, that is, when the vehicle 500 is decelerating. The CPU 91 calculates the acceleration identification value WD as "3" when the front-rear acceleration W is zero, that is, when the vehicle 500 is traveling at a constant speed. The calculation of the acceleration identification value WD by the CPU 91 can be regarded as the acquisition of the acceleration identification value WD by the CPU 91. The acceleration identification value WD is the acceleration variable.

When the CPU 91 acquires the various variables, the CPU 91 advances the process to step S20. The process of step S10 is the acquisition process. In step S20, the CPU 91 selects a mapping Dx to be used for calculating the estimated differential pressure ΔPS based on the phase variable PHS. The storage device 95 stores a selection map that associates the phase variables PHS with the mappings Dx for the phases. The CPU 91 refers to the selection map to select the mapping Dx for the phase corresponding to the phase variable PHS acquired in step S10 from the mappings Dx for the phases stored in the storage device 95. When the CPU 91 selects the mapping Dx, the process proceeds to step S30. The process of step S20 is the selection process.

In step S30, as a preprocessing for calculating the estimated differential pressure ΔPS, the CPU 91 substitutes the values of the various variables acquired in the process of step S10 into the input variables x(1) to x(6) for input to the mapping. Specifically, the CPU 91 substitutes the instruction differential pressure ΔPG into the input variable x(1). The CPU 91 substitutes the acceleration identification value WD into the input variable x(2). The CPU 91 substitutes the accelerator operation amount ACCP into the input variable x(3). The CPU 91 substitutes the vehicle speed SP into the input variable x(4). The CPU 91 substitutes the target shift stage SFT into the input variable x(5). The CPU 91 substitutes the oil temperature L into the input variable x(6). After that, the CPU 91 advances the process to step S40.

In step S40, the CPU 91 calculates an output variable y by inputting the input variables x(1) to x(6) into the mapping Dx selected in step S20. The output variable y is the estimated differential pressure ΔPS.

The mapping Dx is configured as a fully connected feedforward neural network with one intermediate layer. The above neural network includes an activation function h(x) as an input side nonlinear mapping that non-linearly transforms each of the input side coefficient wFjk (j=0 to n, k=0 to 6) and the output of the input side linear mapping which is a linear mapping defined by the input side coefficient wFjk. In the present embodiment, the hyperbolic tangent "tanh(x)" is exemplified as the activation function h(x). Further, the above neural network includes an activation function f(x) as an output side nonlinear mapping that non-linearly transforms each of the output side coefficient wSj (j=0 to n) and the output of the output side linear mapping which is a linear mapping defined by the output side coefficient wSj. In the present embodiment, the hyperbolic tangent "tanh(x)" is exemplified as the activation function f(x). The value n indicates the dimension of the intermediate layer. The input side coefficient wFj0 is a bias parameter and is a coefficient of the input variable x(0). The input variable x(0) is defined as "1". The output side coefficient wS0 is a bias parameter.

The mapping Dx is a learned model that has been machine-trained by using a power transmission device including the internal combustion engine 10, the torque converter 20, the automatic transmission 80, the hydraulic circuit 40, and the like mounted on the vehicle 500 before being mounted on the vehicle 500. For training of the mapping Dx, training data and teacher data are acquired in advance. That is, the training data and the teacher data are created by attaching the power transmission device to the chassis dynamometer and simulating the traveling of the vehicle. In creating the training data and the teacher data, various states of the power transmission device are set and the engagement process is executed. The state of the power transmission device is defined by a combination of the acceleration state of the vehicle, the accelerator operation amount ACCP, the vehicle speed SP, the shift stage, and the oil temperature L. The acceleration state of the vehicle may be determined as any of accelerating, decelerating, or traveling at a constant speed. That is, for each of the three patterns of the acceleration state of the vehicle, the engagement process is executed by simulating the situation in which the values of the other parameters are combined in various ways, and the actual lockup differential pressure in each situation (hereinafter, referred to as actual differential pressure) $\Delta PR$ is acquired as the teacher data. Further, at the same timing as the actual differential pressure $\Delta PR$ is acquired, the values of the various variables that are the input variables to the mapping Dx are acquired as the training data. At this time, the values of the various variables are acquired in the same manner as in the process of step S10. The actual differential pressure $\Delta PR$ may be calculated based on the detected value of the oil pressure sensor by attaching the oil pressure sensor to the hydraulic circuit 40. Specifically, in the hydraulic circuit 40, the oil pressure of the oil passage connected to the control port 25a is detected as the oil pressure PC of the control oil chamber 25. Further, in the hydraulic circuit 40, the oil pressure of the oil passage connected to the supply port 26a is detected as the oil pressure PF of the front side oil chamber 26. Then, the actual differential pressure $\Delta PR$ may be calculated based on these detected values. In this way, after acquiring the training data and the teacher data for each state of the power transmission device, the training of the mapping Dx is performed using a set of the training data and the teacher data for each state of the power transmission device. That is, regarding the various states of the power transmission device, the input side variable and the output side variable are adjusted such that the difference between the value output by the mapping Dx with the training data as the input and the teacher data that is the actual differential pressure $\Delta PR$ is equal to or less than a predetermined value. Then, it is assumed that the training is completed when the above difference becomes equal to or less than the predetermined value. The training of the mapping Dx is performed for the phase corresponding to the mapping Dx.

When the CPU 91 calculates the estimated differential pressure $\Delta PS$ as the output variable yin step S40, the CPU 91 temporarily ends the series of processes of the differential pressure estimation process. Then, the CPU 91 executes the process of step S10 again on condition that the engagement process is being executed. The process of step S40 is the calculation process.

The operations of the embodiment will be described. The CPU 91 calculates the estimated differential pressure $\Delta PS$ of the torque converter 20 using the mapping data D during the execution of the engagement process. In the calculation, the CPU 91 selects the mapping Dx corresponding to the phase of the engagement process, and inputs the various input variables to the selected mapping Dx to calculate the estimated differential pressure $\Delta PS$.

The effects of the embodiment will be described.

(1) As shown by a long dashed double-short dashed line in FIG. 4, the actual differential pressure $\Delta PR$ in the torque converter 20 may deviate from the instruction differential pressure $\Delta PG$. For example, the actual differential pressure $\Delta PR$ may delay in start of change with respect to the instruction differential pressure $\Delta PG$, or may change slowly while the instruction differential pressure $\Delta PG$ changes suddenly. Based on these circumstances, in order to accurately calculate the estimated differential pressure $\Delta PS$, it is necessary to appropriately incorporate the relationship between the instruction differential pressure $\Delta PG$ and the actual differential pressure $\Delta PR$ into the calculation of the estimated differential pressure $\Delta PS$.

In order to incorporate the relationship between the instruction differential pressure $\Delta PG$ and the actual differential pressure $\Delta PR$ into the calculation of the estimated differential pressure $\Delta PS$, it is conceivable to derive the relational expression expressing the relationship between the instruction differential pressure $\Delta PG$ and the actual differential pressure $\Delta PR$ for use for the calculation of the estimated differential pressure $\Delta PS$. However, in an attempt to derive one relational expression suitable for various traveling states of the vehicle 500, it is difficult to derive such a relational expression because content of the relational expression becomes very complicated or lacks accuracy. Even when attempting to derive the above relational expression for each traveling state of the vehicle 500, it is necessary to analyze the relationship between the instruction differential pressure $\Delta PG$ and the actual differential pressure $\Delta PR$ one by one for each traveling state of the vehicle 500 to derive a relational expression suitable for each traveling state, which takes time and effort.

In this regard, in the case of calculating the estimated differential pressure $\Delta PS$ using the mapping Dx as in the present embodiment, when appropriate training data and teacher data can be prepared, it is possible to incorporate the relationship between the instruction differential pressure $\Delta PG$ and the actual differential pressure $\Delta PR$ into the calculation of the estimated differential pressure $\Delta PS$ without the necessity of time and effort of deriving a complicated relational expression. Moreover, for calculating the estimated differential pressure $\Delta PS$ using the mapping Dx, the accuracy of the estimated differential pressure $\Delta PS$ can be ensured when a certain number of pieces of training data and teacher data can be prepared. Further, in the present embodiment, not only the instruction differential pressure $\Delta PG$ but also the plurality of variables are adopted as the input variables. Therefore, in calculating the estimated differential pressure $\Delta PS$, it is possible to calculate the estimated differential pressure $\Delta PS$ in consideration of the relationship between the variables and the actual differential pressure $\Delta PR$. Thus, it is possible to calculate the estimated differential pressure $\Delta PS$ with high accuracy. The estimated differential pressure $\Delta PS$ calculated in this way can be used for learning process of the control program related to the supply of oil pressure to the lockup clutch 30, modification of the control program, design of the lockup clutch of another vehicle, and the like.

(2) In the present embodiment, the features of the way of providing the instruction differential pressure $\Delta PG$ differ depending on the phase of the engagement process. For example, in the first phase Q1, the instruction differential pressure $\Delta PG$ is rapidly increased, whereas in the second phase Q2, the instruction differential pressure $\Delta PG$ is rapidly decreased. In the third phase Q3, the instruction differential pressure $\Delta PG$ is gradually increased. The way of providing the instruction differential pressure $\Delta PG$ differs depending on the phase in this way. Accordingly, the way of response of the actual differential pressure $\Delta PR$ also differs depending on the phase. Therefore, in order to accurately calculate the estimated differential pressure $\Delta PS$, it is necessary to incorporate the relationship between the instruction differential pressure $\Delta PG$ and the actual differential pressure $\Delta PR$ for each phase into the calculation of the estimated differential pressure $\Delta PS$ for that phase.

In the present embodiment, since the dedicated mapping Dx is used for each phase, the relationship between the instruction differential pressure $\Delta PG$ and the actual differential pressure ΔPR for each phase can be incorporated into the calculation of the estimated differential pressure ΔPS. Therefore, the calculation accuracy of the estimated differential pressure ΔPS in each phase becomes high.

(3) The magnitude of the torque acting on the torque converter 20 during acceleration of the vehicle 500 differs from that during deceleration of the vehicle 500. Here, it is assumed that when the operating state of the lockup clutch 30 is the engaged state, torque is transmitted with the same slip amount both during acceleration of the vehicle 500 and during deceleration of the vehicle 500. During acceleration of the vehicle 500, the output of the internal combustion engine 10 is input to the input shaft 21 of the torque converter 20. Then, the output shaft 22 rotates following the input shaft 21 of the torque converter 20. On the other hand, during deceleration of the vehicle 500, the output from the internal combustion engine 10 becomes small. Then, the input shaft 21 rotates following the output shaft 22 in the torque converter 20. The magnitude of the torque transmitted between the input shaft 21 and the output shaft 22 during deceleration of the vehicle 500 becomes small by order unit, compared with the magnitude of the torque transmitted during acceleration of the vehicle 500, that is, the magnitude of the torque corresponding to the output of the internal combustion engine 10. Due to these differences, the required magnitude of the lockup differential pressure ΔP differs even when the same slip amount is realized both during acceleration of the vehicle 500 and during deceleration of the vehicle 500.

Thus, even when the slip amount in the target operating state of the lockup clutch is the same both during acceleration of the vehicle 500 and during deceleration of the vehicle 500, the final target differential pressure P3 differs. As the final target differential pressure P3 differs, the way of changing the instruction differential pressure ΔPG such as the differential pressure change rate α that causes the instruction differential pressure ΔPG to reach the final target differential pressure P3 differs. Since the way of changing the instruction differential pressure ΔPG differs, the relationship between the instruction differential pressure ΔPG and the actual differential pressure ΔPR during acceleration of the vehicle 500 may also differ from that during deceleration of the vehicle 500.

In the present embodiment, the acceleration identification value WD is included as one of the input variables to the mapping Dx. Based on this, the estimated differential pressure ΔPS can be calculated in consideration of the response characteristics of the actual differential pressure ΔPR corresponding to each of the ways of changing the instruction differential pressure ΔPG during acceleration of the vehicle 500 and during deceleration of the vehicle 500.

(4) The magnitude of the torque input to the torque converter 20 differs depending on the accelerator operation amount ACCP. Therefore, as in (3) above, the way of changing the instruction differential pressure ΔPG differs depending on the accelerator operation amount ACCP. When the accelerator operation amount ACCP is included as one of the input variables to the mapping Dx as in the present embodiment, it is possible to calculate the estimated differential pressure ΔPS in consideration of the response characteristics of the actual differential pressure ΔPR corresponding to the way of changing the instruction differential pressure ΔPG for each accelerator operation amount ACCP.

(5) In the lockup map, the driving range in which the target operating state of the lockup clutch 30 is the fully-engaged state is set more toward the higher vehicle speed side than the driving range in which the target operating state is the semi-engaged state. That is, the slip amount defined as the target operating state of the lockup clutch 30 differs depending on the vehicle speed SP. Therefore, the way of changing the final target differential pressure P3 and the instruction differential pressure ΔPG until it reaches the final target differential pressure P3 differs depending on the vehicle speed SP. Since the vehicle speed SP is included as one of the input variables to the mapping Dx in the present embodiment, it is possible to calculate the estimated differential pressure ΔPS in consideration of the response characteristics of the actual differential pressure ΔPR corresponding to the way of changing the instruction differential pressure ΔPG for each vehicle speed SP.

(6) The slip amount defined as the target operating state of the lockup clutch 30 differs depending on the target shift stage SFT as with the vehicle speed SP. Therefore, the way of changing the instruction differential pressure ΔPG differs depending on the target shift stage SFT. Since the target shift stage SFT is included as one of the input variables to the mapping Dx in the present embodiment, it is possible to calculate the estimated differential pressure ΔPS in consideration of the response characteristics of the actual differential pressure ΔPR corresponding to the way of changing the instruction differential pressure ΔPG for each target shift stage SFT.

(7) The lower the oil temperature L, the higher the viscosity of the hydraulic oil. Due to the relationship between the oil temperature L and the viscosity of the hydraulic oil, the oil temperature L can affect the response characteristics of the actual differential pressure ΔPR to the instruction differential pressure ΔPG. When the oil temperature L is included as one of the input variables as in the present embodiment, it is possible to calculate the estimated differential pressure ΔPS in consideration of the response characteristics of the actual differential pressure ΔPR to the instruction differential pressure ΔPG corresponding to the oil temperature L.

Modifications of the present embodiment will be described. The modifications of the present embodiment are implemented by modifying the above-described embodiment as follows. The present embodiment and the modifications below may be carried out in combination within a technically consistent range.

Figure 6:
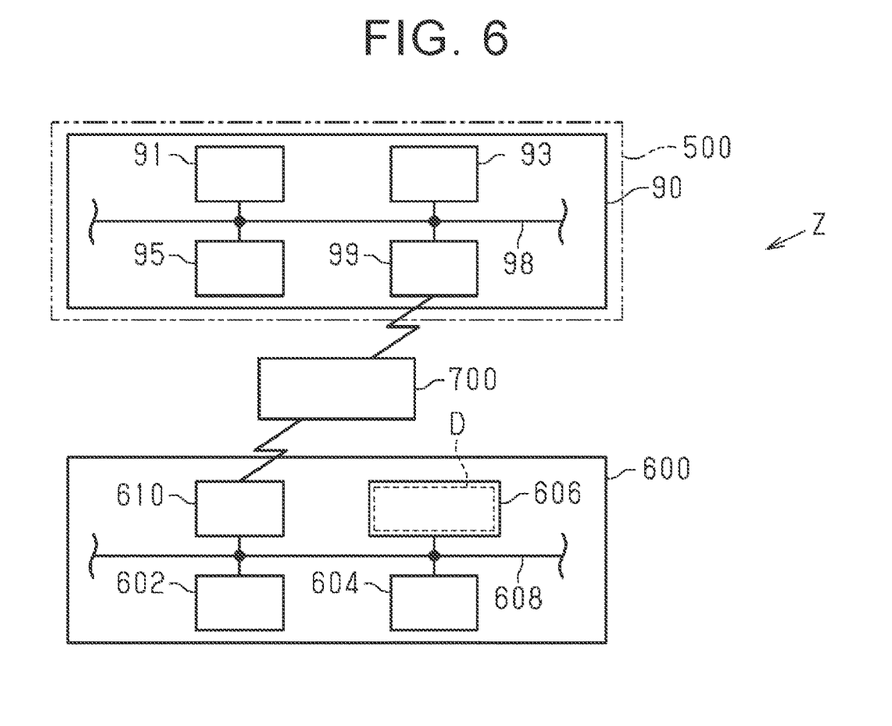
FIG. 6 is a schematic diagram showing a modification of the oil pressure estimation device according to the embodiment.

Part of the differential pressure estimation process may be executed by a computer outside the vehicle 500. For example, as shown in FIG. 6, a server 600 may be provided outside the vehicle 500. Then, the configuration may be adopted in which the server 600 executes the selection process and the calculation process of the differential pressure estimation process. In this case, the server 600 can be configured as one or more processors that execute various processes according to a computer program (software). The server 600 may be configured as one or more dedicated hardware circuits such as application specific integrated circuits (ASICs) that execute at least a part of the various processes, or circuitry including a combination of the hardware circuits. The processor includes a CPU 602 and a memory such as a RAM and a ROM 604. The memory stores program codes or commands configured to cause the CPU 602 to execute the processes. The memory, namely, a computer-readable medium, includes any available medium accessible to a general-purpose or dedicated computer. Further, the server 600 includes a storage device 606 that is an electrically rewritable non-volatile memory. The storage device 606 stores the mapping data D described in the above embodiment, that is, the mapping Dx for each phase. Further, the server 600 includes a communication device 610 for connecting to the outside of the server 600 through an external communication network 700. The CPU 602, the ROM 604, the storage device 606, and the communication device 610 can communicate with each other via an internal bus 608.

When the server 600 executes the selection process and the calculation process of the differential pressure estimation process, the control device 90 of the vehicle 500 includes a communication device 99 for communicating with the outside of the control device 90 through the external communication network 700. The configuration of the control device 90 is the same as that of the above-described embodiment except that it includes the communication device 99. Therefore, a detailed description of the control device 90 will be omitted. In FIG. 6, the parts having the same functions as those in FIG. 1 are designated by the same reference signs as those in FIG. 1. The control device 90 constitutes an oil pressure estimation device Z together with the server 600.

When the selection process and the calculation process of the differential pressure estimation process are executed by the server 600, the control device 90 of the vehicle 500 first executes the acquisition process that is the process of step S10 of the above embodiment. When the control device 90 acquires the various variables in the process of step S10, the control device 90 transmits the values of the acquired various variables to the server 600. When receiving the values of the various variables, the CPU 602 of the server 600 calculates the estimated differential pressure ΔPS by executing the processes of steps S20, S30, and S40 of the above embodiment. The CPU 602 of the server 600 executes the processes of steps S20, S30, and S40 by executing the program stored in the ROM 604.

When the differential pressure estimation process is executed by the control device 90 of the vehicle 500 and the server 600 as in the present modification, the CPU 91 and the ROM 93 of the control device 90 of the vehicle 500 and the CPU 602 and the ROM 604 of the server 600 constitute the execution device.

The entire differential pressure estimation process may be executed outside the vehicle 500. For example, when the server 600 is provided outside the vehicle 500 as in the above modification, the control device 90 of the vehicle 500 transmits detection signals of various sensors attached to the vehicle 500 to the server 600. The control device 90 of the vehicle 500 also transmits other variables used in the differential pressure estimation process, such as the phase variable PHS and the target shift stage SFT, to the server 600. Then, the CPU 602 of the server 600 executes the process corresponding to step S10 of the above embodiment to acquire the values of the various variables. After that, the CPU 602 of the server 600 executes the processes corresponding to the steps S20, S30, and S40, as in the above modification. In such a configuration, the server 600 executes the acquisition process, the selection process, and the calculation process.

When the differential pressure estimation process is executed outside the vehicle 500, the differential pressure estimation process may be executed regardless of the timing at which the instruction differential pressure ΔPG is output in the engagement process. That is, the differential pressure estimation process may be executed alone instead of executing the differential pressure estimation process along with the execution of the engagement process. For example, by creating time-series data of the various variables necessary for calculating the estimated differential pressure ΔPS in advance, it is possible to calculate the estimated differential pressure ΔPS by executing only the differential pressure estimation process independently of the engagement process.

In the above embodiment, the estimated differential pressure ΔPS may be calculated using the same mapping Dx in each phase of the engagement process. It is presumed that, in each phase of the engagement process, the behaviors such as the delay of the actual differential pressure ΔPR with respect to the instruction differential pressure ΔPG are roughly similar. Therefore, even if the same mapping Dx is used in each phase, some degree of accuracy can be expected regarding the estimated differential pressure ΔPS.

The estimated differential pressure ΔPS may be calculated when the operating state of the lockup clutch 30 is switched from the engaged state to the released state. In this case, a mapping Dx dedicated to the case of switching the operating state of the lockup clutch 30 to the released state may be used, or the same mapping Dx as for the case of switching the operating state of the lockup clutch 30 to the engaged state may be used. Further, the mapping Dx for each phase of the plurality of phases obtained by dividing the period for switching the operating state of the lockup clutch 30 to the released state may be used.

The way of specifying the phase in the phase specification process is not limited to the example of the above embodiment. For example, when specifying the end timing of the third phase Q3, a rotation speed difference may be used that is a value obtained by subtracting the rotation speed of the output shaft 22 from the rotation speed of the input shaft 21 of the torque converter 20. Specifically, the timing at which the rotation speed difference reaches a value defined by the target operating state may be specified as the end timing of the third phase Q3. In this case, a crank angle sensor for detecting the rotation angle of the crankshaft of the internal combustion engine 10 may be provided in the vehicle 500, and the rotation speed of the crankshaft based on the detected value of the sensor may be set as the rotation speed of the input shaft 21. Further, a rotation angle sensor for detecting the rotation angle of the input shaft of the automatic transmission 80 may be provided in the vehicle 500, and the rotation speed of the input shaft of the automatic transmission 80 based on the detected value of the sensor may be set as the rotation speed of the output shaft 22 of the torque converter 20.

The way of dividing the process into phases in the engagement process is not limited to the example of the above embodiment. For example, a stage of maintaining the instruction differential pressure ΔPG at the application differential pressure P1 and a stage of maintaining the instruction differential pressure ΔPG at the standby differential pressure P2 may be combined into one phase. When changing the way of dividing the process into phases, the mapping Dx for each changed phase may be prepared.

The time-series change of the instruction differential pressure ΔPG in the engagement process is not limited to the example of the above embodiment. For example, the first period, the second period, and the third period may be variably set in accordance with the traveling state of the vehicle 500 and the like. Further, the application differential pressure P1 and the standby differential pressure P2 may be set to be variable in accordance with the traveling state of the vehicle 500 and the like. Further, instead of keeping the differential pressure change rate α constant over the third period, the differential pressure change rate α may be changed in the middle of the third period. The time-series change of the instruction differential pressure ΔPG in the engagement process only needs to be appropriate for switching the lockup clutch 30 to the engaged state. When content of the time-series change of the instruction differential pressure ΔPG is changed from the content of the above-described embodiment, the way of dividing the process into phases and the way of specifying the phase may be appropriately determined in accordance with the change.

As described in the section of the effects of the embodiment, the magnitude of the torque acting on the torque converter 20 differs depending on the acceleration state of the vehicle 500. Therefore, a mapping Dx may be prepared for each acceleration state of the vehicle 500. Specifically, a dedicated mapping Dx may be prepared for each of the cases where the vehicle 500 is accelerating, the vehicle 500 is decelerating, and the vehicle 500 is traveling at a constant speed. Then, the estimated differential pressure ΔPS may be calculated by the dedicated mapping Dx for each acceleration state of the vehicle 500.

The accelerator operation amount ACCP acquired in step S10 is not limited to the latest value at the time of executing the process of step S10. For example, the maximum value of the accelerator operation amount ACCP in the period from the execution of step S10 at the previous timing to the execution of the next step S10 may be acquired. Further, rather than acquiring the instantaneous value, the average value of the accelerator operation amounts ACCP for a certain period may be acquired. The same applies to the vehicle speed SP and the oil temperature L. In addition, from the same viewpoint, the acceleration identification value WD may be calculated based on the average value of the front-rear acceleration W for a certain period and the like, rather than the instantaneous value of the front-rear acceleration W.

The variable adopted as the instruction differential pressure variable is not limited to the example of the above embodiment. For example, a value obtained by multiplying the instruction differential pressure ΔPG by a correction coefficient or the like suitable for accurately calculating the estimated differential pressure ΔPS may be adopted as the instruction differential pressure variable. The instruction differential pressure variable may be any variable indicating the instruction differential pressure ΔPG.

The variable adopted as the acceleration variable is not limited to the example of the above embodiment. For example, the rotation speed difference that is a value obtained by subtracting the rotation speed of the output shaft 22 from the rotation speed of the input shaft 21 of the torque converter 20 may be used as the acceleration variable. When the lockup clutch 30 is in the semi-engaged state, the rotation speed of the input shaft 21 becomes higher than the rotation speed of the output shaft 22 while the vehicle 500 is accelerating. On the other hand, while the vehicle 500 is decelerating, the rotation speed of the output shaft 22 becomes higher than the rotation speed of the input shaft 21. Therefore, the sign of the rotation speed difference is reversed between the rotation speed difference during acceleration of the vehicle 500 and the rotation speed difference during deceleration of the vehicle 500. Thus, the rotation speed difference can be an index indicating the acceleration state of the vehicle 500. As described in the above modification, the rotation speed of the input shaft 21 may be the rotation speed of the crankshaft. The rotation speed of the output shaft 22 may be the rotation speed of the input shaft of the automatic transmission 80. The acceleration variable may be any variable indicating the front-rear acceleration W of the vehicle 500.

The variable adopted as the accelerator operation amount variable is not limited to the example of the above embodiment. The throttle opening degree of the internal combustion engine 10 has a positive correlation with the accelerator operation amount ACCP. Therefore, for example, the throttle opening degree of the internal combustion engine 10 may be adopted as the accelerator operation amount variable. In this case, the internal combustion engine 10 may be provided with an opening degree sensor that detects the throttle opening degree. The accelerator operation amount variable may be any variable indicating the accelerator operation amount ACCP.

The variable adopted as the vehicle speed variable is not limited to the example of the above embodiment. For example, the rotation speed of the output shaft of the automatic transmission 80 may be adopted as the vehicle speed variable. In this case, a rotation angle sensor for detecting the rotation angle of the output shaft of the automatic transmission 80 may be provided in the vehicle 500, and the rotation speed of the output shaft 22 of the automatic transmission 80 may be calculated based on the detected value of the sensor. The vehicle speed variable may be any variable indicating the vehicle speed SP.

The variable adopted as the shift variable is not limited to the example of the above embodiment. For example, the ratio between the rotation speed of the input shaft of the automatic transmission 80 and the rotation speed of the output shaft, that is, the actual gear ratio may be adopted as the shift variable. The shift variable may be any variable indicating the gear ratio of the transmission.

The variable adopted as the oil temperature variable is not limited to the example of the above embodiment. For example, the oil temperature L may be divided into a plurality of levels, and a value indicating such a level may be adopted as the oil temperature variable. The oil temperature variable may be any variable indicating the oil temperature L.

Similar to the oil temperature variable in the modification, for the other input variables, a plurality of levels may be set corresponding to the degrees, and a value indicating such a level may be adopted. The types of the input variables are not limited to the examples of the above embodiment. As the input variables, other variables may be adopted in place of or in addition to those shown in the above embodiment. Further, the number of input variables may be reduced from the number in the above-described embodiment. The number of input variables may be two or more. The input variables only need to include the instruction differential pressure variable as one of the two or more input variables.

The acceleration variable, the accelerator variable, the vehicle speed variable, the shift variable, and the oil temperature variable are not essential as the input variables. Even when these variables are not included, as long as the two or more variables including the instruction differential pressure variable are adopted as the input variables, the estimated differential pressure ΔPS can be calculated with accordingly high accuracy.

As the input variable, a variable other than the variables shown in the above embodiment may be adopted. As the input variable, for example, a variable indicating the degree of age deterioration of the hydraulic circuit 40 may be adopted. Specifically, the total mileage of the vehicle 500 or the like may be adopted as the variable indicating the degree of age deterioration of the hydraulic circuit 40. The response characteristics of the actual differential pressure ΔPR to the instruction differential pressure ΔPG may change depending on the degree of age deterioration of the hydraulic circuit 40. Therefore, when the variable indicating the degree of age deterioration of the hydraulic circuit 40 is adopted as one of the input variables, the estimated differential pressure ΔPS can be calculated in consideration of the degree of age deterioration of the hydraulic circuit 40.

The variable adopted as the estimated oil pressure variable is not limited to the example of the above embodiment. For example, an estimated value of the difference in the flow rate when the lockup differential pressure ΔP is converted into the difference in the flow rate of the hydraulic oil may be adopted as the estimated oil pressure variable. The estimated oil pressure variable may be a variable indicating the estimated differential pressure ΔPS.

The configuration of the mapping Dx is not limited to the example of the above embodiment. For example, the number of the intermediate layers in the neural network may be two or more.

As the neural network, for example, a recurrent neural network may be adopted. In this case, the values of the past input variables are incorporated when the value of the output variable is newly calculated, which is suitable for calculating the estimated differential pressure ΔPS incorporating the past history.

The way of acquiring the training data and the teacher data used for training of the mapping Dx is not limited to the example of the above embodiment. For example, a vehicle having the same specifications as the vehicle 500 may actually be run to acquire the training data and the teacher data.

As shown in the following equation (1), the lockup differential pressure ΔP may be obtained by subtracting the average value of the oil pressure PF of the front side oil chamber 26 and the oil pressure PB of the rear side oil chamber from the oil pressure PC of the control oil chamber 25.

$$\Delta P = PC - ((PF+PB)/2) \tag{1}$$

The lockup differential pressure ΔP only needs to indicate the differential pressure between the control oil chamber 25 and the front side oil chamber 26.

The overall configuration of the vehicle 500 is not limited to the example of the above embodiment. For example, as the drive source for the vehicle 500, a motor generator may be provided in place of or in addition to the internal combustion engine 10. A continuously variable transmission may be adopted as the automatic transmission.

The mode of connection of the torque converter 20 to the internal combustion engine 10 and the automatic transmission 80 is not limited to the example of the above embodiment. For example, the input shaft of the automatic transmission 80 may be the output shaft 22 of the torque converter 20 itself.

The numbers of the first friction plates 32 and the second friction plates 34 are not limited to the example of the above embodiment. The numbers of the first friction plates 32 and the second friction plates 34 may respectively be one or more. Content of the lockup map is not limited to the example of the above embodiment. The lockup map only needs to have content that allows appropriate switching of the operating state of the lockup clutch 30.

What is claimed is:

1. An oil pressure estimation device comprising one or more processors configured to:
    set, as a simulation target, a torque converter including two oil chambers and a lockup clutch, the lockup clutch being switched between an engaged state and a released state in accordance with a differential pressure between the two oil chambers;
    calculate, based on an instruction differential pressure that is an instruction value of the differential pressure for the torque converter, an estimated differential pressure that is an estimated value of the differential pressure generated in the torque converter;
    store, in a memory, mapping data defining a mapping, the mapping (i) outputting as an output variable, in response to input of an input variable, an estimated differential pressure variable that is a variable indicating the estimated differential pressure, (ii) having been trained by machine learning, and (iii) including an instruction differential pressure variable that is a variable indicating the instruction differential pressure as one of a plurality of the input variables; and
    execute an acquisition process of acquiring a value of the input variable and a calculation process of inputting the value of the input variable acquired through the acquisition process into the mapping to calculate a value of the output variable.

2. The oil pressure estimation device according to claim 1, wherein:
    the memory and the one or more processors are provided in a vehicle equipped with the torque converter; and
    the one or more processors are configured to:
        store, in the memory, a plurality of mappings for respective phases obtained by dividing into a plurality of phases a period from (i) a start of switching of the lockup clutch to the engaged state to (ii) a start of switching of the lockup clutch to the released state;
        acquire the value of the input variable when the instruction differential pressure is output to the torque converter;
        select, from the mappings for the respective phases, a mapping corresponding to a phase in which the instruction differential pressure is output; and
        calculate the value of the output variable by inputting the acquired value of the input variable into the selected mapping.

3. The oil pressure estimation device according to claim 2, wherein of the plurality of input variables include an acceleration variable that is a variable indicating an acceleration of the vehicle.

4. The oil pressure estimation device according to claim 2, wherein the plurality of input variables include an accelerator variable that is a variable indicating an operation amount of an accelerator pedal of the vehicle.

5. The oil pressure estimation device according to claim 2, wherein the plurality of input variables include a vehicle speed variable that is a variable indicating a traveling speed of the vehicle.

6. The oil pressure estimation device according to claim 2, wherein the plurality of input variables include a shift variable that is a variable indicating a gear ratio of a transmission of the vehicle.

7. The oil pressure estimation device according to claim 2, wherein the plurality of input variables include an oil temperature variable that is a variable indicating a temperature of hydraulic oil supplied to the torque converter.

8. A non-transitory storage medium storing instructions that are executable by one or more processors included in an oil pressure estimation device and that cause the one or more processors to perform functions comprising:
    acquiring a value of an input variable;
    inputting the value of the acquired input variable into a mapping to calculate a value of an output variable;

setting, as a simulation target, a torque converter including two oil chambers and a lockup clutch, the lockup clutch being switched between an engaged state and a released state in accordance with a differential pressure between the two oil chambers; and storing, in a memory, mapping data defining a mapping, the mapping (i) outputting as the output variable, in response to input of the input variable, an estimated differential pressure variable that is a variable indicating an estimated differential pressure, which is an estimated value of the differential pressure generated in the torque converter, (ii) having been trained by machine learning, and (iii) including as one of a plurality of the input variables an instruction differential pressure variable that is a variable indicating an instruction differential pressure, which is an instruction value of the differential pressure for the torque converter.

* * * * *